United States Patent
Ohno et al.

(10) Patent No.: US 7,732,366 B2
(45) Date of Patent: Jun. 8, 2010

(54) HONEYCOMB STRUCTURE AND EXHAUST GAS PURIFYING DEVICE

(75) Inventors: Kazushige Ohno, Gifu (JP); Masafumi Kunieda, Gifu (JP); Akihiro Ohira, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 571 days.

(21) Appl. No.: 11/708,335

(22) Filed: Feb. 21, 2007

(65) Prior Publication Data

US 2007/0196620 A1 Aug. 23, 2007

(30) Foreign Application Priority Data

Feb. 23, 2006 (JP) .............................. 2006-047348
Aug. 25, 2006 (WO) ................. PCT/JP2006/316748

(51) Int. Cl.
| | |
|---|---|
| B01J 27/24 | (2006.01) |
| B01J 23/00 | (2006.01) |
| B01J 21/04 | (2006.01) |
| B01J 23/02 | (2006.01) |
| B01D 50/00 | (2006.01) |
| B01D 59/50 | (2006.01) |
| B01D 39/06 | (2006.01) |
| B01D 39/20 | (2006.01) |
| B01D 39/14 | (2006.01) |
| B01D 53/34 | (2006.01) |
| F01N 3/10 | (2006.01) |
| F01N 3/00 | (2006.01) |
| B23B 3/12 | (2006.01) |
| F23J 11/00 | (2006.01) |

(52) U.S. Cl. ...................... 502/200; 502/302; 502/325; 502/439; 502/527.19; 55/385.3; 55/523; 55/524; 60/299; 60/302; 428/116; 428/117; 422/168; 422/177; 422/180

(58) Field of Classification Search ................. 502/200, 502/302, 325, 439, 527.19; 55/385.3, 523, 55/524; 60/299, 302; 428/116, 117; 422/168, 422/177, 180
See application file for complete search history.

(56) References Cited

U.S. PATENT DOCUMENTS

| | | | | |
|---|---|---|---|---|
| 5,462,905 | A | * 10/1995 | Nagami et al. | ............... 502/232 |
| 5,853,444 | A | 12/1998 | Maier et al. | |
| 5,914,187 | A | 6/1999 | Naruse et al. | |
| 6,669,751 | B1 | * 12/2003 | Ohno et al. | ................... 55/523 |
| 6,939,825 | B1 | 9/2005 | Ohno et al. | |

(Continued)

FOREIGN PATENT DOCUMENTS

EP      1 541 216 A1     6/2005

(Continued)

OTHER PUBLICATIONS

Translation of Written Opinion for PCT/JP2006/316748.*

(Continued)

*Primary Examiner*—Patricia L Hailey
(74) *Attorney, Agent, or Firm*—Finnegan, Henderson, Farabow, Garrett & Dunner, L.L.P.

(57) ABSTRACT

A honeycomb structure comprises a porous ceramic which is composed of several cells aligned across a cell wall longitudinally. The cell has either one end sealed. The gas permeability coefficient k of the cell wall is between about 0.5 µm$^2$ and about 1.5 µm$^2$.

20 Claims, 8 Drawing Sheets

U.S. PATENT DOCUMENTS

| | | | |
|---|---|---|---|
| 7,119,046 B2 | 10/2006 | Ohno et al. | |
| 7,309,370 B2 * | 12/2007 | Kudo et al. | 55/523 |
| 2002/0061811 A1 | 5/2002 | Merkel | |
| 2003/0166450 A1 | 9/2003 | Kumazawa et al. | |
| 2004/0029707 A1 | 2/2004 | Beall et al. | |
| 2004/0033175 A1 | 2/2004 | Ohno et al. | |
| 2004/0055265 A1 | 3/2004 | Ohno et al. | |
| 2004/0076626 A1 | 4/2004 | Mohler et al. | |
| 2004/0109023 A1 | 6/2004 | Tsuchiya | |
| 2004/0161596 A1 | 8/2004 | Taoka et al. | |
| 2005/0102987 A1 | 5/2005 | Kudo | |
| 2005/0153099 A1 * | 7/2005 | Yamada | 428/117 |
| 2005/0160710 A1 | 7/2005 | Taoka et al. | |
| 2005/0161849 A1 | 7/2005 | Ohno et al. | |
| 2005/0169818 A1 | 8/2005 | Ohno et al. | |
| 2005/0169819 A1 | 8/2005 | Shibata | |
| 2005/0175514 A1 * | 8/2005 | Ohno | 422/177 |
| 2005/0176581 A1 | 8/2005 | Ohno et al. | |
| 2005/0178098 A1 | 8/2005 | Ono et al. | |
| 2005/0180898 A1 | 8/2005 | Yamada | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0051556 A1 | 3/2006 | Ohno et al. | |
| 2006/0073970 A1 | 4/2006 | Yamada | |
| 2006/0135343 A1 | 6/2006 | Ohno et al. | |
| 2006/0154021 A1 | 7/2006 | Ohno et al. | |
| 2006/0166820 A1 | 7/2006 | Ogyu et al. | |
| 2006/0172113 A1 | 8/2006 | Kunieda | |
| 2006/0175741 A1 * | 8/2006 | Kawasaki et al. | 264/647 |
| 2006/0179803 A1 | 8/2006 | Ohno et al. | |
| 2006/0188415 A1 | 8/2006 | Ohno et al. | |
| 2006/0194018 A1 | 8/2006 | Ohno et al. | |
| 2006/0213163 A1 | 9/2006 | Taoka et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0269722 A1 | 11/2006 | Yamada | |
| 2007/0020155 A1 | 1/2007 | Ohno et al. | |
| 2007/0044444 A1 * | 3/2007 | Oshimi | 55/523 |
| 2007/0199205 A1 | 8/2007 | Hoshino et al. | |
| 2008/0120950 A1 | 5/2008 | Ohno et al. | |
| 2008/0136062 A1 | 6/2008 | Kasai et al. | |
| 2008/0174039 A1 | 7/2008 | Saijo et al. | |
| 2008/0197544 A1 | 8/2008 | Saijo et al. | |
| 2008/0211127 A1 * | 9/2008 | Naruse et al. | 264/45.1 |
| 2008/0213485 A1 | 9/2008 | Shibata | |
| 2008/0236115 A1 | 10/2008 | Sakashita | |
| 2008/0236724 A1 | 10/2008 | Higuchi | |
| 2008/0237942 A1 * | 10/2008 | Takamatsu | |
| 2008/0241013 A1 * | 10/2008 | Ohno et al. | 422/180 |
| 2008/0241015 A1 | 10/2008 | Kudo et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |
| 2009/0079111 A1 * | 3/2009 | Kasai et al. | 264/489 |
| 2009/0107879 A1 | 4/2009 | Otsuka et al. | |
| 2009/0130378 A1 | 5/2009 | Imaeda et al. | |
| 2009/0199953 A1 | 8/2009 | Sato | |
| 2009/0202402 A1 | 8/2009 | Sato | |
| 2009/0220735 A1 | 9/2009 | Mizuno et al. | |
| 2009/0238732 A1 | 9/2009 | Ohno | |
| 2009/0242100 A1 | 10/2009 | Saijo | |
| 2009/0243165 A1 | 10/2009 | Hiroshima | |
| 2009/0252906 A1 | 10/2009 | Higuchi | |

FOREIGN PATENT DOCUMENTS

| | | | |
|---|---|---|---|
| EP | 1 790 407 A1 | | 5/2007 |
| EP | 1 826 370 | * | 8/2007 |
| JP | 2002-219319 | | 8/2002 |
| JP | 2002-357114 | | 12/2002 |
| JP | 2006-326574 | | 12/2006 |
| WO | WO 01/25166 | | 4/2001 |
| WO | WO 02/26351 A1 | | 4/2002 |
| WO | 03/082772 | * | 10/2003 |
| WO | WO 03/082772 A1 | | 10/2003 |
| WO | 03/093657 | * | 11/2003 |
| WO | 2004/083148 | * | 9/2004 |
| WO | WO 2004/076027 A1 | | 9/2004 |
| WO | WO 2004/083148 A1 | | 9/2004 |
| WO | WO 2006/035822 A1 | | 4/2006 |
| WO | WO 2006/035823 A1 | | 4/2006 |
| WO | WO 2006/041174 A1 | | 4/2006 |
| WO | 2006/057344 | * | 6/2006 |
| WO | WO 2006/057344 A1 | | 6/2006 |
| WO | WO 2006/070504 A1 | | 7/2006 |
| WO | WO 2006/082938 A1 | | 8/2006 |
| WO | WO 2006/082940 A1 | | 8/2006 |
| WO | WO 2006/087932 A1 | | 8/2006 |
| WO | WO 2006/117899 A1 | | 11/2006 |
| WO | WO 2007/086183 A1 | | 8/2007 |

OTHER PUBLICATIONS

Korean Office Action dated Jan. 23, 2008 (3 pages).
EP Office Action dated Feb. 18, 2008 regarding application No. 06 027 064.2-1213 (4 pgs.).
European Search Report on EP 06027064.2.

* cited by examiner

FIG.6

| | COARSE PARTICLE OF SiC | | FINE PARTICLE OF SiC | | HOLLOW ACRYLIC PARTICLE | | METHYL CELLULOSE | PLASTICIZER | LUBRICANT | WATER |
|---|---|---|---|---|---|---|---|---|---|---|
| | PARTICLE SIZE (μm) | AMOUNT (wt%) | PARTICLE SIZE (μm) | AMOUNT (wt%) | PARTICLE SIZE (μm) | AMOUNT (wt%) | AMOUNT (wt%) | AMOUNT (wt%) | AMOUNT (wt%) | AMOUNT (wt%) |
| EXAMINATION BODY 1 | 7 | 7000 | 0.5 | 3000 | — | — | 550 | 330 | 150 | APPROPRIATE AMOUNT |
| EXAMINATION BODY 2 | 10 | 7000 | 0.5 | 3000 | — | — | 570 | 330 | 150 | APPROPRIATE AMOUNT |
| EXAMINATION BODY 3 | 22 | 7000 | 0.5 | 3000 | — | — | 570 | 330 | 150 | APPROPRIATE AMOUNT |
| EXAMINATION BODY 4 | 22 | 6290 | 0.5 | 2690 | 20 | 250 | 550 | 330 | 150 | APPROPRIATE AMOUNT |
| EXAMINATION BODY 5 | 22 | 6000 | 0.5 | 2570 | 20 | 300 | 550 | 330 | 150 | APPROPRIATE AMOUNT |
| EXAMINATION BODY 6 | 22 | 5710 | 0.5 | 2450 | 25 | 350 | 550 | 330 | 150 | APPROPRIATE AMOUNT |
| EXAMINATION BODY 7 | 22 | 5420 | 0.5 | 2330 | 30 | 400 | 550 | 330 | 150 | APPROPRIATE AMOUNT |
| EXAMINATION BODY 8 | 30 | 7000 | 0.5 | 3000 | — | — | 550 | 330 | 150 | APPROPRIATE AMOUNT |
| EXAMINATION BODY 9 | 30 | 5130 | 0.5 | 2200 | 40 | 1000 | 550 | 330 | 150 | APPROPRIATE AMOUNT |

FIG.7

| | COATING AMOUNT OF Al$_2$O$_3$ (g/L) | PORE DIAMETER (μm) | PORE RATE (%) | GAS PERMEABILITY COEFFICIENT (μm$^2$) | PRESSURE LOSS (kPa) | CAPTURE EFFICIENCY (%) |
|---|---|---|---|---|---|---|
| EXAMPLE 1 (EXAMINATION BODY 1) | 0 | 7 | 40 | 0.4 | 10.0 | 95 |
| EXAMPLE 2 (EXAMINATION BODY 2) | 0 | 9 | 42 | 0.5 | 8.4 | 95 |
| EXAMPLE 3 (EXAMINATION BODY 3) | 0 | 11 | 42 | 0.9 | 8.0 | 94 |
| EXAMPLE 4 (EXAMINATION BODY 4) | 0 | 12.5 | 45 | 1.2 | 7.8 | 92 |
| EXAMPLE 5 (EXAMINATION BODY 6) | 0 | 17.5 | 50 | 1.8 | 7.8 | 76 |
| EXAMPLE 6 (EXAMINATION BODY 2) | 20 | 9 | 42 | 0.3 | 10.6 | 94 |
| EXAMPLE 7 (EXAMINATION BODY 3) | 20 | 11 | 42 | 0.6 | 8.2 | 92 |
| EXAMPLE 8 (EXAMINATION BODY 4) | 20 | 12.5 | 45 | 1.0 | 8.0 | 90 |
| EXAMPLE 9 (EXAMINATION BODY 5) | 20 | 15 | 47.5 | 1.3 | 7.8 | 87 |
| EXAMPLE 10 (EXAMINATION BODY 6) | 20 | 17.5 | 50 | 1.7 | 7.8 | 75 |
| EXAMPLE 11 (EXAMINATION BODY 3) | 40 | 11 | 42 | 0.4 | 10.3 | 94 |
| EXAMPLE 12 (EXAMINATION BODY 4) | 40 | 12.5 | 45 | 0.9 | 8.1 | 91 |
| EXAMPLE 13 (EXAMINATION BODY 5) | 40 | 15 | 47.5 | 1.2 | 7.9 | 85 |
| EXAMPLE 14 (EXAMINATION BODY 6) | 40 | 17.5 | 50 | 1.6 | 7.8 | 79 |
| EXAMPLE 15 (EXAMINATION BODY 3) | 60 | 11 | 42 | 0.3 | 10.9 | 95 |
| EXAMPLE 16 (EXAMINATION BODY 4) | 60 | 12.5 | 45 | 0.7 | 8.1 | 92 |
| EXAMPLE 17 (EXAMINATION BODY 5) | 60 | 15 | 47.5 | 1.1 | 7.9 | 89 |
| EXAMPLE 18 (EXAMINATION BODY 6) | 60 | 17.5 | 50 | 1.4 | 7.8 | 85 |
| EXAMPLE 19 (EXAMINATION BODY 7) | 60 | 20 | 52.5 | 1.6 | 7.8 | 78 |
| EXAMPLE 20 (EXAMINATION BODY 8) | 80 | 12.5 | 42 | 0.4 | 10.2 | 94 |
| EXAMPLE 21 (EXAMINATION BODY 4) | 80 | 12.5 | 45 | 0.5 | 8.5 | 94 |
| EXAMPLE 22 (EXAMINATION BODY 5) | 80 | 15 | 47.5 | 0.9 | 8.0 | 91 |
| EXAMPLE 23 (EXAMINATION BODY 6) | 80 | 17.5 | 50 | 1.3 | 7.8 | 89 |
| EXAMPLE 24 (EXAMINATION BODY 9) | 80 | 22.5 | 55 | 1.6 | 7.8 | 78 |

HONEYCOMB STRUCTURE AND EXHAUST GAS PURIFYING DEVICE

CROSS-REFERENCE TO RELATED APPLICATIONS

This application claims priority of JP 2006-047348 filed on Feb. 23, 2006 and PCT/JP2006/316748 filed on Aug. 25, 2006. This contents of these applications are incorporated herein by reference in their entirety.

BACKGROUND OF THE INVENTION

1. Field of the Invention

The present invention relates to a honeycomb structure and an exhaust gas purifying device.

2. Description of the Related Art

Exhaust gas including the particulate matter which mainly has carbon is discharged from vehicles such as buses, trucks and so on; internal combustion engines such as machines for construction; and diesel engines in particular. However, the impacts on the environment and human health caused by the particulate matter have become problems recently. Form example, various compounds are adsorbed in the particulate matter which mainly has carbon, so that the impact on health of the human body by such an adsorbed compounds is a concern.

In such circumstances and based on studies, a filter in which the particulate matter in the exhaust gas is captured so as to purify the exhaust gas, especially a filter with several honeycomb structures composed of porous ceramic is proposed.

For example, several filters comprising honeycomb structures composed of several rectangular-pillar shaped cells that are adjacent across a porous cell wall where each cell elongates longitudinally are proposed. For the honeycomb structure, either end of the cell is sealed with plug for each cell. When the exhaust gas introduced in the honeycomb structure is discharged from the honeycomb structure, the exhaust gas passes through the cell wall. For the filter having such a structure, when the exhaust gas passes though the cell wall, the particulate matter in the exhaust gas is captured (JP 2002-219319A).

Also, in order to convert harmful chemical ingredients such as CO, HC, NOx and so on included in the exhaust gas by means of a catalyst component, after a catalyst carrying layer that is provided on a surface of the cell wall elongates longitudinally in the honeycomb structure, the catalyst is adhered on the catalyst carrying layer. As in the above, such a honeycomb structure is proposed (JP 2002-357114A).

The contents of JP 2002-219319A and JP 2002-357114A are incorporated herein by reference in their entirety.

SUMMARY OF THE INVENTION

The honeycomb structure of the present invention is characterized that comprising a porous ceramic which is composed of several cells aligned across a cell wall longitudinally, the cell having either one end sealed, in which a gas permeability coefficient k of the cell wall is between about 0.5 $\mu m^2$ and about 1.5 $\mu m^2$.

For the above honeycomb structure, it is preferable that the catalyst carrying layer and a catalyst are placed on the cell wall.

For the above honeycomb structure, it is preferable that the catalyst carrying layer is provided with about 40 g or more against an appearance capacity 1 L of the honeycomb structure, and the gas permeability coefficient k in a step before placing the catalyst carrying layer is in the range about 1.0 $\mu m^2$ or more.

For the above honeycomb structure, it is preferable that the porous ceramic comprises at least one selected from the group consisting of aluminum nitride, silicon nitride, boron nitride, titanium nitride, silicon carbide, zirconium carbide, titanium carbide, tantalum carbide, tungsten carbide, alumina, zirconia, cordielite, mullite, silica and aluminum titanate.

For the above honeycomb structure, it is preferable that the catalyst carrying layer comprises at least one selected from the group consisting of alumina, titania, zirconia, silica and ceria.

For the above honeycomb structure, it is preferable that the catalyst comprises noble metals.

For the above honeycomb structure, it is preferable that the catalyst comprises at least one selected from the group consisting of platinum, palladium and rhodium.

For the above honeycomb structure, it is preferable that the catalyst is a compound including any one of an alkali metallic element, an alkaline earth metallic element, a rare-earth element and a transition metal element.

For the above honeycomb structure, it is preferable that the catalyst is provided both compounds which one compound including noble metals and the other compound including any one of an alkali metallic element, an alkaline earth metallic element, a rare-earth element and a transition metal element.

For the above honeycomb structure, it is preferable that the catalyst comprises at least one selected from the group consisting of platinum, palladium and rhodium.

The exhaust gas purifying device of the present invention is characterized that comprising a honeycomb structure, a casing covering the outer surface of the honeycomb structure and a holding sealer provided between the honeycomb structure and the casing, wherein the honeycomb structure comprising a porous ceramic which is composed of several cells aligned across a cell wall longitudinally, the cell having either one end sealed, in which a gas permeability coefficient k of the cell wall is between about 0.5 $\mu m^2$ and about 1.5 $\mu m^2$.

For the above exhaust gas purifying device, it is preferable that the catalyst carrying layer and a catalyst are placed on the cell wall.

For the above exhaust gas purifying device, it is preferable that the catalyst carrying layer is provided with about 40 g or more against an appearance capacity 1 L of the honeycomb structure, and the gas permeability coefficient k in a step before placing the catalyst carrying layer is in the range about 1.0 $\mu m^2$ or more.

For the above exhaust gas purifying device, it is preferable that the porous ceramic comprises at least one selected from the group consisting of aluminum nitride, silicon nitride, boron nitride, titanium nitride, silicon carbide, zirconium carbide, titanium carbide, tantalum carbide, tungsten carbide, alumina, zirconia, cordielite, mullite, silica and aluminum titanate.

For the above exhaust gas purifying device, it is preferable that the catalyst carrying layer comprises at least one selected from the group consisting of alumina, titania, zirconia, silica and ceria.

For the above exhaust gas purifying device, it is preferable that the catalyst comprises noble metals.

For the above exhaust gas purifying device, it is preferable that the catalyst comprises at least one selected from the group consisting of platinum, palladium and rhodium.

For the above exhaust gas purifying device, it is preferable that the catalyst is a compound including any one of an alkali metallic element, an alkaline earth metallic element, a rare-earth element and a transition metal element.

For the above exhaust gas purifying device, it is preferable that the catalyst is provided both compounds which one compound including noble metals and the other compound including any one of an alkali metallic element, an alkaline earth metallic element, a rare-earth element and a transition metal element.

For the above exhaust gas purifying device, it is preferable that the catalyst comprises at least one selected from the group consisting of platinum, palladium and rhodium.

BRIEF DESCRIPTION OF THE DRAWINGS

Other objects, features and advantages of the present invention will become more apparent from the following detailed description when read in conjunction with the accompanying drawings, in which:

FIG. 6 is a table for explaining about the manufacturing process of the honeycomb structure of the embodiment according to the present invention;

FIG. 7 is a table for showing a relationship between a particles capture efficiency and a gas permeability coefficient using the honeycomb structure of the embodiment according to the present invention;

DETAILED DESCRIPTION OF THE PREFERRED EMBODIMENTS

Figure 1:
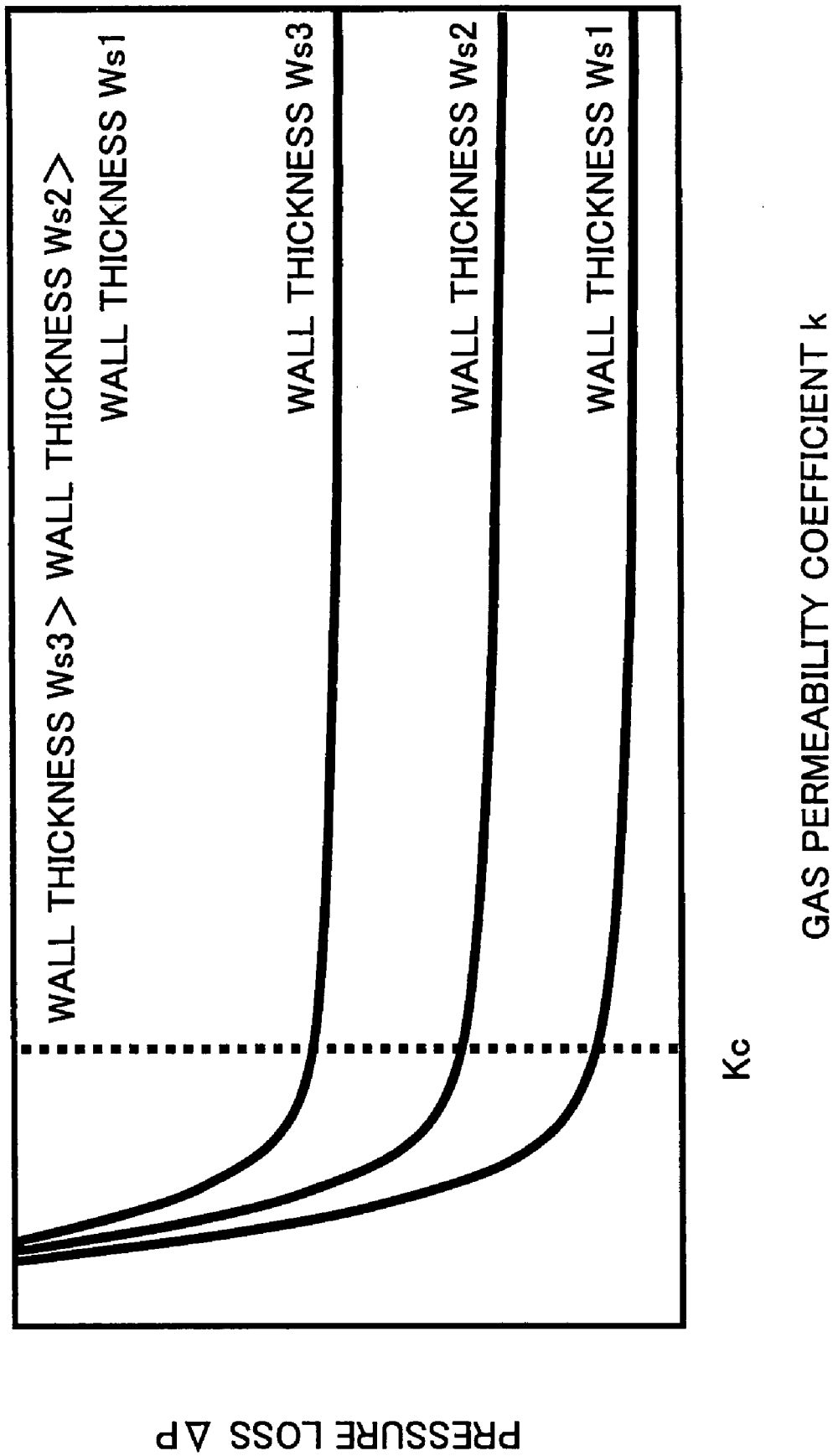
FIG. 1 is a conceptual diagram showing a relationship between the gas permeability coefficient and the pressure loss of the honeycomb structure.

The honeycomb structure of an embodiment according to the present invention is the honeycomb structure comprising the porous ceramic which is composed of several cells aligned across a cell wall longitudinally, the cells in which one end is sealed, and characterised in that the gas permeability coefficient k of the cell wall is between about 0.5 μm² and about 1.5 μm². Here, the gas permeability coefficient k is a parameter (permeability) which shows a degree of the passage when gas passes through the cell wall of the honeycomb structure, and the pressure loss ΔP (kPa) is shown as below formula (1) and a relationship shown in the following formula (1) is concluded.

$$\Delta P = \frac{\mu Q}{2V_{trap}}(a+w_s)^2 \left[ \frac{w_s}{ka} + \frac{8FL}{3a^4} \right] + \frac{2\zeta\rho Q^2(a+w_s)^4}{V_{trap}^2 a^2}\left(\frac{L}{a}\right)^2 \quad \text{FORMULA (1)}$$

Here, Q is a gas flow quantity (m³/s), μ is a gas moving viscosity, $V_{trap}$ is an effective honeycomb structure capacity (m³), a is a cell width (m), $w_s$ is a cell wall thickness (m), L is an outer diameter of the honeycomb structure (m) and ζ is called a compression/expansion inertia loss coefficient and it is due to circulation cross-section area of gas changing in discontinuity in end surfaces of a honeycomb structure, a parameter mainly determined by an aperture rate of both edge surface and shape of the honeycomb structure, ρ is a gas density (kg/m³) and F is a constant (28.454). Among these, $V_{trap}$, a, $w_s$, L and ζ are determined by the shape of the honeycomb structure, while μ and ρ are uniformly determined by temperature and kind of gas.

For the honeycomb structure of the embodiment which has the above range of the gas permeability coefficient k of the cell wall, there is a tendency that both low pressure loss and high capture efficiency, which are important characteristics for good filter performance, is satisfied.

In the honeycomb structure (for example, JP 2002-219319A and JP 2002-357114A) in which one end of the above cell is sealed, materials composing the honeycomb structure cell wall and characteristics of the structure have great influence on the filter performance. For example, when the pore rate of a cell wall (partition) becomes small, there is a tendency that pressure loss of exhaust gas rises. On the other hand, when the pore rate of a cell wall (partition) becomes big, there is a tendency that capture efficiency of particulate matter and the like decreases. Therefore, it is recognized that there is a necessity to manage the manufacturing process so that the pore rate of the honeycomb structure is stably controlled to provide good filter performance such as a low pressure loss or high capture efficiency.

However, since the above honeycomb structure (for example, JP 2002-219319A and JP 2002-357114A) is manufactured by firing at high temperature exceeding about 2,000 degrees Celsius, for example, it is hard to control the pore rate of the honeycomb structure with high precision. Especially, for the above honeycomb structure (for example, JP 2002-219319A and JP 2002-357114A) having the catalyst carrying layer, when the catalyst carrying layer is provided on the partition, one part of a pore in a cell wall is blocked up and there is a possibility that the pore structure is greatly changed in before and after of the catalyst carrying layer. Therefore, it is hard to control an important factor determining the filter performance such as a pressure loss and capture efficiency in stably only by management of pore rate and pore diameter of the honeycomb structure.

In order to get a honeycomb structure in which the pressure loss and the capture efficiency of particulate matter are maintained in appropriate ranges without the influence of a parameter having the great variation of the pore rate and the pore diameter, it is recognized that to manage the manufacturing process with the gas permeability coefficient k.

When the gas permeability coefficient k is in the above range, the pressure loss is not so sensitive to a change of the gas permeability coefficient k. When the gas permeability coefficient k is selected as a management parameter to manage the manufacturing process, there is a tendency that a decreasing of characteristics of the honeycomb structure by a change in management value of the management parameter can be avoided to some extent.

Also, the embodiment of the honeycomb structure according to the present invention can be applied to one kind of honeycomb structures provided with the catalyst and the catalyst carrying layer, and the catalyst and the catalyst carrying layer may be provided on the cell wall.

Usually, when the catalyst carrying layer is provided on the cell wall, there is a tendency that the gas permeability coefficient k is decreased corresponding to a provided amount of the catalyst carrying layer. Here, in the case of the embodiment of the one type of honeycomb structures provided the catalyst carrying layer with about 40 g or more against an appearance capacity 1 L of the honeycomb structure, it is preferable that the gas permeability coefficient k of the cell wall before providing the catalyst carrying layer be about 1.0 $\mu m^2$ or more. Thereby, there is a tendency that the catalyst amount provided on the honeycomb structure can be within a desired variation range and without carrying surplus catalyst, the quantity of use of a noble metal can be reduced, and also manufacturing cost can be reduced. Also, the appearance capacity is a capacity that includes all of pores of a sample (open pore and closed pore) and apertures.

The exhaust gas purifying device of the embodiment according to the present invention is characterized that comprising a honeycomb structure, a casing covering the outer surface of the honeycomb structure and a holding sealer provided between the honeycomb structure and the casing, wherein the honeycomb structure comprising a porous ceramic which is composed of several cells aligned across a cell wall longitudinally, the cell having either one end sealed, in which a gas permeability coefficient k of the cell wall is between about 0.5 $\mu m^2$ and about 1.5 $m^2$. That is, the exhaust gas purifying device which the honeycomb structure of the embodiment according to the present invention is provided in the casing, it is possible to give the same effect as well as the above the honeycomb structure of the embodiment according to the present invention.

For the embodiment of the present invention, the gas permeability coefficient of the cell wall as the parameter defining characteristics of the honeycomb structure is used and the gas permeability coefficient is controlled within a range of predetermined values; thereby, the honeycomb structure having the low pressure loss and the high capture efficiency and the exhaust gas purifying device can be provided.

FIG. 1 shows a typical relationship between the gas permeability coefficient k and the pressure loss $\Delta P$. The pressure loss is decreased as the gas permeability coefficient k is increased. It is thought that the characteristics of the present invention are that a drastic change of the pressure loss as shown in the case where the gas permeability coefficient k is smaller than $k_c$ does not occur when the gas permeability coefficient k is beyond the predetermined value ($k_c$), and a change rate of the pressure loss is decreased. For region ($k \geq k_c$) where the change rate of the pressure loss is controlled, when a characteristic of the honeycomb structure is managed by the parameter gas permeability coefficient k, it is recognized that a state with few changes of the pressure loss can be maintained in the honeycomb structure. In other words, when the gas permeability coefficient k is selected such that the pressure loss of the honeycomb structure is in the above region (that is, the lowest value of the gas permeability coefficient k is determined), even if the gas permeability coefficient k fluctuates to some extent, it is thought that there is a tendency of an influence that such a change gives to the pressure loss is small. Therefore, a problem of a conventional method to manage the characteristic of the honeycomb structure at the pore rate or the pore diameter is solved. The conventional problem is that a management parameter greatly fluctuates with a manufacturing step, a filter characteristic of the honeycomb structure after completion cannot be recognized, and desired filter performance is not provided by the honeycomb structure after completion.

However, when the honeycomb structure is used as the filter, the capture efficiency is nominated as the characteristic that the honeycomb structure requires other than the pressure loss. Thus it is necessary to consider relationships with the capture efficiency that is another important characteristic to influence the gas permeability coefficient k and the filter performance. It is generally expected that the capture efficiency of the honeycomb structure decreases when the gas permeability coefficient k grows big. Therefore, it is thought that the gas permeability coefficient k has an upper limit value.

According to the above-mentioned consideration, it is founded that the honeycomb structure which satisfies both low pressure loss and high capture efficiency can be provided when the gas permeability coefficient k is between about 0.5 $\mu m^2$ and about 1.5 $\mu m^2$. In this case, even if the management parameter such as the pore rate and the pore diameter that changes drastically are not used, there is a tendency that a characteristic of the honeycomb structure can be controlled in a desired range by determining the range of the gas permeability coefficient k as described the above.

Also, it is preferable that the gas permeability coefficient k be between about 0.5 $\mu m^2$ and about 1.5 $\mu m^2$ in the case of one kind of honeycomb structures of the embodiment provided the catalyst carrying layer and the catalyst. Especially, in the case of the honeycomb structure providing the catalyst carrying layer with about 40 g or more against an appearance capacity 1 L of the honeycomb structure, it is preferable that early gas permeability coefficient k before providing the catalyst carrying layer be about 1.0 $\mu m^2$ or more. Thereby, as described below, there is a tendency that the catalyst amount provided on the honeycomb structure of the embodiment can be within a desired variation range and without carrying surplus catalyst and the quantity of noble metal used can be reduced and also manufacturing cost can be reduced.

In order to change the gas permeability coefficient k, it can be made by changing pore rate, pore diameter and the like of the honeycomb structure. Also, pore rate and pore diameter can be adjustable by changing the diameter and ration of materials (material particle, binder, plasticizer, lubricant, pore making agent and so on) and also changing conditions of removing oil, drying and firing.

In the below, a description is given, with reference to the accompanying drawings, of an embodiment of the present invention.

Figure 2:
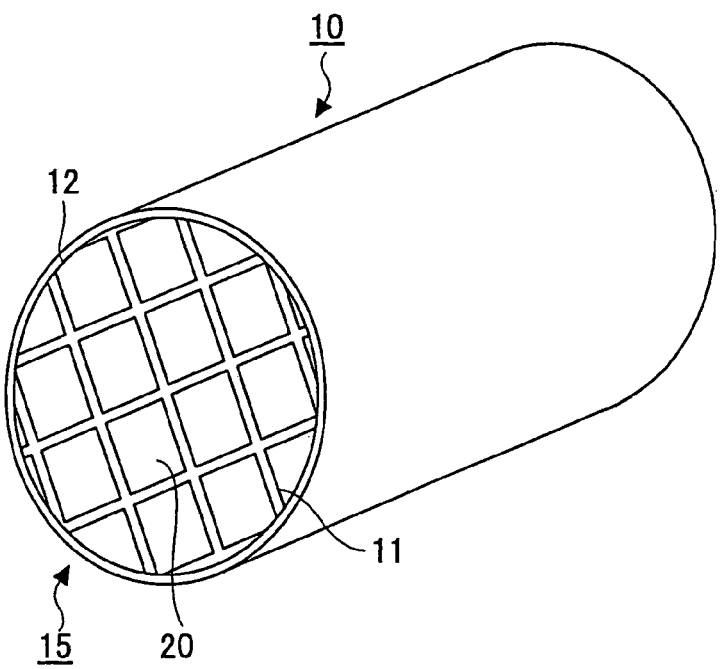
FIG. 2 is a perspective view showing typically one example of the honeycomb structure of the embodiment according to the present invention.
Figure 3:
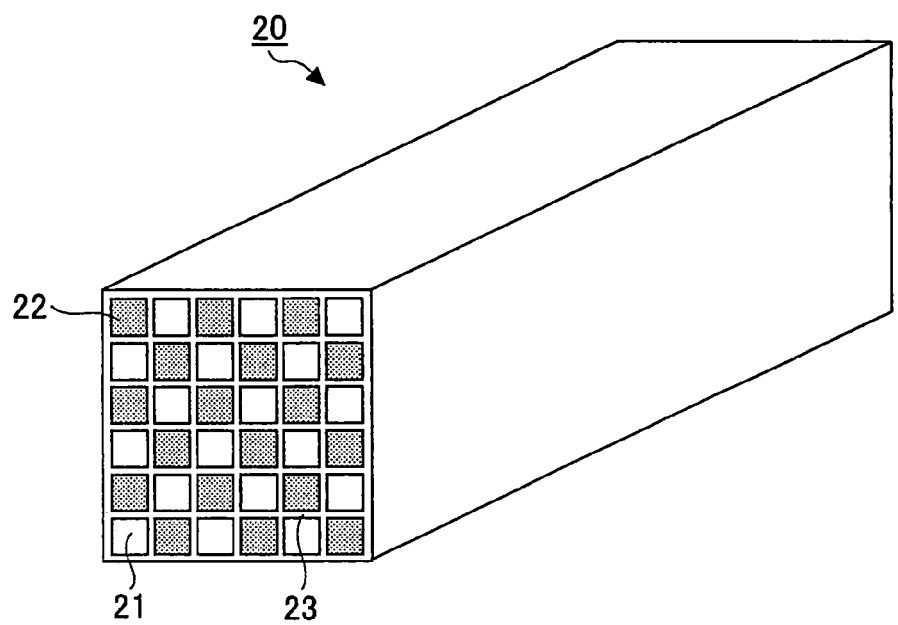
FIG. 3 is a perspective view showing typically porous ceramic composing the honeycomb structure of the embodiment according to the present invention.

FIG. 2 is a perspective view showing one typical example of the honeycomb structure of the embodiment according to the present invention. Also, FIG. 3 is a perspective view showing porous ceramic 20 composing the honeycomb structure shown in FIG. 2. Also, FIG. 4 is a sectional longitudinal view showing the porous ceramic 20 of FIG. 3.

As shown FIG. 2, the honeycomb structure 10 of the present invention is constructed such that plural porous ceramics 20 comprising silicon carbide are combined via an adhesive layer 11. After that, the porous ceramics 20 which are joined with the adhesive layer 11 are processed into a cylindrical shape, and a ceramic block 15 is constructed. Even more particularly, around this ceramic block 15, the coating layer (herein after, it is described as a sealing material layer) 12 is provided.

Also, for the honeycomb structure 10 shown in FIG. 2, the shape of this ceramic block 15 is cylindrical. However, in the present invention, if the ceramic block is pillar shaped, it need not be limited to a cylindrical shape, for example, it may be any shape such as cylindroid shape or rectangular-pillar shape.

Figure 4:
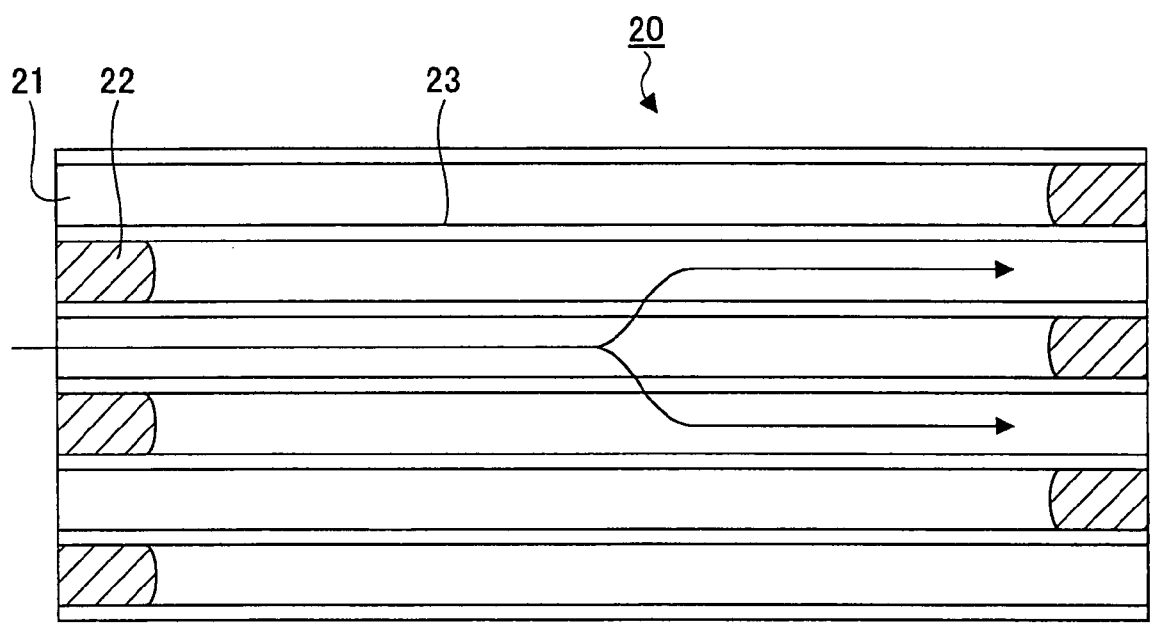
FIG. 4 is a sectional longitudinal view showing the porous ceramic of FIG. 3.

As shown in FIG. 3 and FIG. 4, several cells 21 are aligned longitudinally in a porous ceramic 20, and the cell wall 23 which separates the cells 21 from each other performs as a filter. That is, as shown in FIG. 4, either inlet or exit of the cell 21 formed in the porous ceramic 20 is sealed with plug 22. Thereby, the exhaust gas introduced in any one of cells 21 is discharged from another cell 21 after the gas has passed through the cell wall 23 which separates the cells 21 by all means.

The honeycomb structure of the embodiment according to the present invention is mainly comprising porous ceramic, and nitride ceramic such as aluminum nitride, silicon nitride, boron nitride and titanium nitride; carbide ceramic such as silicon carbide, zirconium carbide, titanium carbide, tantalum carbide and tungsten carbide; and oxide ceramic such as alumina, zirconia, cordielite, mullite, silica and aluminum titanate are nominated for materials for the porous ceramic. Also, the honeycomb structure 10 may be comprised of materials more than two kinds like composites with silicon and silicon carbide, or the like. When the composites with silicon and silicon carbide are used, it is desirable to add silicon to become 0-about 45 total percent by weight.

Among the above porous ceramics, silicon carbide base ceramic, which has high heat resistance, is superior in mechanical properties, and its better heat conductance is desirable. Also, the silicon carbide base ceramic means materials in which silicon carbide is included about 60 percent by weight or more.

A particle size of the ceramic used when manufacturing the honeycomb structure 10 is not limited, but it is preferable to use powder having little shrinkage during the following firing process. For example, it is preferable to combine powder of 100 weight percent having average particle size of about 0.3-about 50 μm with powder of about 5-about 65 weight percent having average particle size of about 0.1-about 1.0 μm.

It is preferable that a wall part (cell wall 23) and the plug 22 in the porous ceramic 20 comprise the same porous ceramic. Thereby, adhesion strength of both can tend to be raised, by means of coordinating the pore rate of the plug 22 the same as the wall part (cell wall 23). Integrity with an expansion coefficient of the wall part (cell wall 23) and an expansion coefficient of the plug 22 can tend to be planned, also a gap between the plug 22 and the wall part (cell wall 23) is hard to occur, and the occurrence of a crack at the plug 22 and the wall part (cell wall 23) contacting the plug 22 by means of stress at production time and at the time of use can tend to be prevented. Also, wall part means both the cell wall which separates the cells 21 from each other and an outer peripheral portion of the porous ceramic 20.

A thickness of the plug 22 is not limited, but for example, it is preferable that the thickness be between about 1 and about 20 mm and more preferable between about 3 and about 10 mm when the plug is comprising the porous silicon carbide.

A thickness of the cell wall 23 is not limited, but it is preferable that the desirable lowest limit be about 0.1 mm and the desirable highest limit be about 0.6 mm. When the thickness is about 0.1 mm or more, the strength of the honeycomb structure tends to have enough strength and when the thickness is about 0.6 mm or less, the pressure loss tends to be hard to rise.

For the honeycomb structure 10 of the present invention, the adhesive layer 11 is formed between porous ceramics 20, and it functions as an adhesive binding several porous ceramics 20 to each other. The sealing material layer 12 is formed on the outside surface of the ceramic block 15. When the honeycomb structure 10 is provided on an exhaust path of the internal combustion engine, the sealing material layer 12 functions as the plug to prevent the exhaust gas which passed through the cell from the outside surface of the ceramic block 15 from leaking out. Also, the sealing material layer 12 functions as a reinforcing structure.

Also, for the porous ceramic 20, the adhesive layer 11 and the sealing material layer 12 may be same material or different material. In addition, when the adhesive layer 11 and the sealing material layer 12 are of the same material, the combination ratio of the materials may be the same ratio or different ratio. Moreover, the adhesive layer 11 and the sealing material layer 12 may have denseness or be porous, but when seal characteristics are regarded as important, it is preferable to have denseness.

Materials comprising the adhesive layer 11 and the sealing material layer 12 are not limited to these, but materials which are composed of inorganic binder, organic binder, inorganic fiber and/or inorganic particle can be used, for example.

For the inorganic binder, silica sol, alumina sol and the like can be used, for example. These may used alone, and when more than two kinds are mixed, it may be used. Among the inorganic binders, silica sol is preferable.

For the organic binder, polyvinyl alcohol, methyl cellulose, ethyl cellulose and the like can be used, for example. These may used alone, and when more than two kinds are mixed, the mixture may be used.

For the inorganic fiber, ceramic fiber such as silica-alumina, mullite, alumina and silica can be used, for example. These may used alone, and when more than two kinds are mixed, the mixture may be used. Among the inorganic fibers, silica-alumina fiber is preferable.

For the inorganic particles, carbide, nitride and the like can be used, for example, inorganic powder comprising silicon carbide, a silicon nitride, a boron nitride or a whisker can be used, especially. These may used alone, and when more than two kinds are mixed, the mixture may be used. Among the inorganic particle, silicon carbide which is superior in heat conductance is preferable.

Also, for an aperture making agent such as a balloon which is a fine hollow globe which component is an oxide family ceramic, spherical acrylic particles and graphite may be added in a paste used for forming the adhesive layer and the sealing material layer, if necessary.

The balloon material is not limited to these, but alumina balloon, glass micro balloon, silas balloon, fly ash balloon, mullite balloon and the like can be used, for example. Among the balloons, alumina balloon is preferable.

Such honeycomb structure 10 can be used as a filter (diesel particulate filter: DPF) which captures particulate matter in the exhaust gas.

Also, a catalyst may be provided on the honeycomb structure 10.

When the catalyst is provided on the honeycomb structure 10, it is preferable that the cell wall be coated with the catalyst carrying layer. Thereby, specific surface area is increased, the ability to disperse the catalyst is raised, and a reaction region of the catalyst can be increased.

For example, oxide ceramic such as alumina, titania, zirconia, silica, and seria are nominated for the catalyst carrying layer.

Also, the catalyst provided on the catalyst carrying layer is not limited to these, but a preferable catalyst is one that is able to convert harmful gas components in the exhaust gas such as CO, HC and NOx and that is able to reduce these components efficiently by decreasing the active energy for burning of particulate matter and make it easy to burn. For example, noble metals such as platinum, palladium and rhodium can be nominated. Also, compounds including an alkali metallic element, alkaline earth metallic element, rare-earth element, transition metal element and the like may be carried.

Also, compounds including both the above noble metals and the above an alkali metallic element, alkaline earth metallic element, rare-earth element, transition metal element and the like may be carried. This is because converting harmful gas components in the exhaust gas such as CO, HC and NOx and reducing these components efficiently by decreasing the active energy for burning of particulate matter and make it easy to burn tend to do at the same time.

Thus, when the catalyst carrying layer is provided on the honeycomb structure 10 and the catalyst is carried on the catalyst carrying layer, the honeycomb structure 10 functions as the filter to capture particulate matter in the exhaust gas and also functions as a catalytic converter for converting CO, HC, NOx and the like included in the exhaust gas.

In the above, characteristics of the embodiment according to the present invention are described with an example of the honeycomb structure of the embodiment as shown in FIG. 2 constructed via the adhesive layer 11 bonding several porous ceramics 20. However, the embodiment according to the present invention can be applied to other kinds of honeycomb structure, that is, one honeycomb structure that it is unified, and the external form as shown in FIG. 2 is formed, and is manufactured without using the adhesive layer. Hereinafter, such a honeycomb structure is described as [the integral honeycomb structure]. Also, the honeycomb structure of a model to join plural porous ceramics 20 through the above-mentioned adhesive is described as [a joined type honeycomb structure]. In this case, first of all, an extrusion molding is performed by using a material paste whose main component is ceramic, and a ceramic molded body having several cells which is the base for the above-mentioned ceramic block is manufactured. Next, after drying this molded body, the plug is filled up either end of each cell and the cell is sealed. Also, in such a method, the integral honeycomb structure which is the same structure as the joined type honeycomb structure shown in FIG. 2 can be obtained.

Next, one example of the manufacturing method of the joined type honeycomb structure of the embodiment according to the present invention is described.

First of all, an extrusion molding is performed by using a material paste whose main component is the above-mentioned ceramic, and a ceramic molded body having the square-pillar shape is manufactured.

The material paste is not limited, but the material paste where the pore rate of the honeycomb structure after production becomes about 40-about 75% is preferable, for example. Also, the material paste may be that a binder, a dispersion solvent and the like are added into powder comprising ceramic as described above.

The particle size of the ceramic powder is not limited to these, but it is preferable to use powder having little shrinkage in the following process. For example, it is preferable to combine powder of 100 weight percent having average particle size of about 0.3-about 50 μm with powder of about 5-about 65 weight percent having average particle size of about 0.1-about 1.0 μm.

The binder is not limited to these, but methyl cellulose, carboxymethylcellulose, hydroxyethylcellulose, polyethylene glycol and the like can be used, for example.

It is desirable that the quantity of combination of the binder is usually about 1-about 10 weight percent as against 100 weight percent of ceramic powders.

The dispersion solvent is not limited to these, but organic solvent such as benzene, alcohol like methanol and water can be used, for example. As for the dispersion solvent, it is blended to an appropriate amount so that the viscosity of material paste is within a predetermined range.

These ceramic powders, a binder and a dispersion solvent are mixed with atoliters, and after kneading the mixture in a kneader enough, the ceramic block is formed by the extrusion molding.

A molding assistant may be added to materials of the paste if necessary.

The molding assistant is not limited to these, but ethylene glycol, dextrin, fatty acid, fatty acid soap, polyvinyl alcohol and the like can be used, for example.

Also, an aperture making agent such as the balloon which is the fine hollow globe which component is oxide family ceramic, spherical acrylic particle and graphite may be added to the material of the paste, if necessary.

Next, the molded body of ceramic formed by the extrusion molding is dried by means of using a micro dryer, hot-air drier, dielectric dryer, decompression dryer, vacuum dryer and freeze dryer, and a ceramic drying body can be obtained. Then, for the both end surfaces of the ceramic drying body, a predetermined amount of the plug paste is filled in the end of the predetermined cell, and either end of each cell is sealed.

The plug paste is not limited to these, but the plug paste where the pore rate of the plug formed after the following process becomes about 30-about 75% is preferable, for example, the same paste as the material paste may be used.

Next, as against the ceramic drying body which is filled with the plug paste, porous ceramic 20 can be manufactured by degreasing (for example, at about 200-about 500 degrees Celsius) and firing (for example, at about 1400-about 2300 degrees Celsius) in a predetermined condition. Conditions for degreasing and firing of the ceramic drying body can apply what is used when filters comprising conventional ceramic are manufactured.

Next, after having applied the adhesive paste which will become the adhesive layer 11 later to four sides of the porous ceramic 20 with uniform thickness, on this adhesive paste layer other ceramics 20 are laminated sequentially. This process is repeated, and the porous ceramic joining body of desired dimensions is manufactured.

Also, the above material paste or the plug paste can be used for the material comprising the adhesive paste.

Next, this porous ceramic joining body is heated, the adhesive paste is dried and fixed, then the adhesive layer 11 is formed, and each porous ceramic 20 is solidified.

Next, the porous ceramic joining body is cut and processed by using a diamond cutter, and a cylindrical ceramic block 15 having a predetermined outer diameter is manufactured.

Also, the sealing material paste (coating paste) is applied to the outer circumferential side of the ceramic block 15, and a drying process and a solidifying process are performed, then the sealing material layer 12 is formed. After such a process, cylindrical joined type honeycomb structures which are bonded with several porous ceramics 20 via the adhesive layer 11 can be manufactured.

Also, the integral honeycomb structure of the embodiment according to the present invention can be manufactured by an approximately similar process. In this case, the ceramic molding body formed by the extrusion molding with a shape near to the final shape is dried after the predetermined ends of the predetermined cells are sealed, the degreasing process and firing process are performed directly, and thereby the integral honeycomb structure can be obtained.

Also, the catalyst such as a noble metal may be provided on the honeycomb structure of the embodiment according to the present invention.

When the catalyst is provided on the honeycomb structure, first of all, the catalyst carrying layer such as aluminum is provided. As for a method forming the catalyst carrying layer on the honeycomb structure, for example, there is a method where the honeycomb structure is dipped in a solution including the alumina powder; after having raised the honeycomb structure, then this honeycomb structure is heated. After that, the honeycomb structure is dipped in a solution such as $Ce(NO_3)_3$, and a rare-earth element may be impregnated in the catalyst carrying layer.

As for a method providing the catalyst on the catalyst carrying layer, for example, a method where the ceramic firing body having the catalyst carrying layer is dipped in a solution of dinitro-dianmine platinum nitric acid ($[Pt(NH_3)_2(NO_2)_2]HNO_3$) and is heated is utilized.

As for other method, the honeycomb structure is dipped in alumina slurry carrying platinum (for example, platinum concentration is about 5 wt %) for about 2 minutes, after having raised the honeycomb structure, then this honeycomb structure is heated at about 500 degrees Celsius, and the platinum catalyst can be provided.

Otherwise, an oxide catalyst such as $CeO_2$—$ZrO_2$ mixture, $CeO_2$—$CuO_2$ mixture, $CeO_2$—$FeO_2$ mixture or $LaCoO_3$ may be provided on the honeycomb structure. When $CeO_2$—$ZrO_2$ mixture as the oxide catalyst is carried on the honeycomb structure, the honeycomb structure is dipped into the solution for about 5 minutes including about 10 g of $CZ(nCeO_2.mZrO_2)$, 40 ml of water and appropriate amount of pH adjuster, and after the honeycomb structure is taken out from the solution, then the method, in which the honeycomb structure is fired at about 500 degrees Celsius, is used.

When $LaCoO_3$ as the oxide catalyst is carried on the honeycomb structure, about 0.01 mol of $La(NO_3)_3.6H_2O$, about 0.01 mol of $Co(CH_3COO)_2.4H_2O$, about 0.024 mol of $C_6H_8O_7.H_2O$ (citric acid) are added into ethanol with 20 ml respectively, and a solution which is mixed and stirred is used. After dipping the honeycomb structure in this solution, and having raised it out, the extra sol is absorbed, and it is removed, and it is dried at about 100 degrees Celsius and fired at about 600 degrees Celsius for about one hour, thereby the honeycomb structure which carries as a catalyst $La(NO_3)_3$ can be obtained.

In the case of the integral honeycomb structure, the catalyst can be provided by the above process after the honeycomb structure is manufactured. On the other hand, in the case of the joined type honeycomb structure, it is noted that the catalyst may be provided in any step after the porous ceramic 20 is manufactured.

A use of the honeycomb structure manufactured in this way is not limited in particular, but it can be applied to the exhaust gas purifying device of vehicles.

Figure 5:
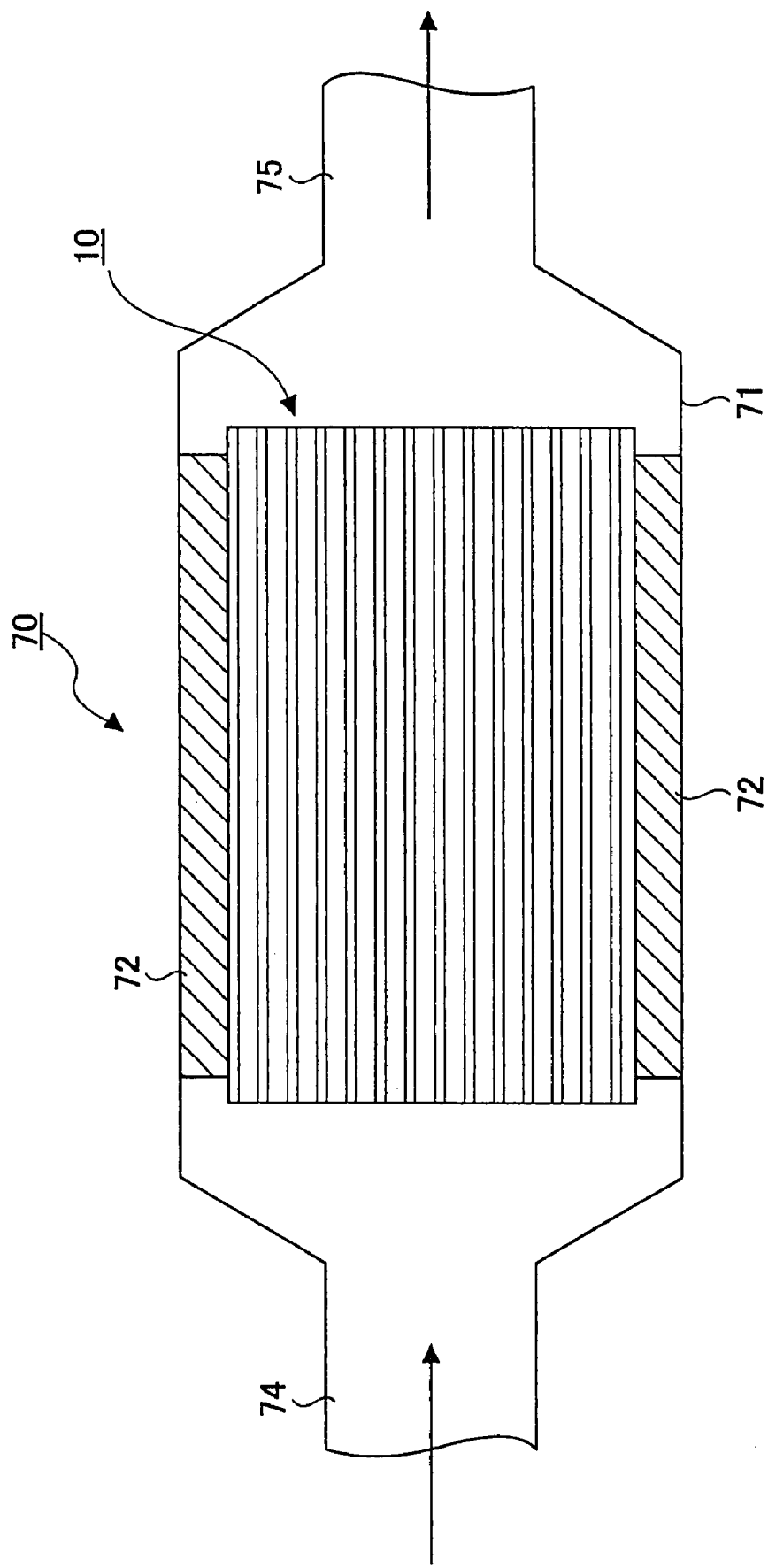
FIG. 5 is a sectional view showing typically one example of the exhaust gas purifying device of a vehicle having the honeycomb structure of the embodiment according to the present invention.

FIG. 5 shows one typical example of the exhaust gas purifying device which is provided with the honeycomb structure of the embodiment according to the present invention.

As shown in FIG. 5, the exhaust gas purifying device 70 is mainly composed of the honeycomb structure 10, a casing 71 covering the outer surface of the honeycomb structure and a holding sealer (mat) 72 provided between the honeycomb structure 10 and the casing 71, an introducing tube 74 which is coupled to the internal combustion engine is connected to an end of the casing 71 through which the exhaust gas is introduced, and a discharge tube 75 which is coupled to outside of the device is connected to the other end of the casing 71. In FIG. 5, an arrow shows the flow of the exhaust gas.

In the exhaust gas purifying device 70 as constructed above, the exhaust gas which is discharged from the internal combustion engine is introduced into the casing 71 via the introducing tube 74, and the exhaust gas flows into the honeycomb structure 10 via the cells whose ends facing the introducing tube 74 of are opened. After the exhaust gas flows into the honeycomb structure 10 and passes through the cell wall, the particulate matter is captured by the cell wall and the exhaust gas is purified, the exhaust gas flows from the honeycomb structure via cells whose ends of the different side from the above ends are opened. Finally, the purified gas is discharged by passing through the discharge tube 75. Also, in the case where the catalyst is provided on the honeycomb structure 10, harmful components in the exhaust gas such as CO, HC and NOx are converted when the exhaust gas passes through the cell wall.

EXAMPLES

A description is given below in more detail. The present invention is not limited to these experimental examples.

Manufacturing of an Examination Body 1

7000 wt % of α-silicon carbide particles (7 μm in average particle size), 3000 wt % of α-silicon carbide particles (0.5 μm in average particle size) and 550 wt % of the organic binder (methylcellulose) were mixed by dry mixing, thereby, a mixture composition was obtained.

Next, 330 wt % of a plasticizer (NOF Corp., UNILUB), 150 wt % of glycerin as a lubricant and water (appropriate amount) were added to the mixture composition, after having kneaded this mixture composition more, it was formed by the extrusion molding, and a rectangular pillar shaped raw molded body shown in FIG. 3 was obtained.

Next, the raw molded body was dried using the microwave dryer and the hot-air drier and made it into a ceramic drying body. After that, the plug paste which has the same composition as well as the above raw molded body was supplied in a predetermined cell.

Next, the drying process is performed again by using the hot-air drier, the degreasing was performed at 400 degrees Celsius with the drying body and the firing process was performed for 3 hours at 2200 degrees Celsius under Ar atmosphere of normal pressures, thereby, the porous ceramic 20 comprising a firing body of silicon carbide having a shape of 34.3 mm×34.3 mm×150 mm was manufactured. The number of cells of the porous ceramic 20 was 46.5 number of cells/$cm^2$ (300 cpsi) and actually, the thickness of all of the cell wall was 0.25 mm.

Next, lots of the porous ceramics 20 were adhered using the adhesive paste including 30 wt % of alumina fibers (0.2 mm in average fiber length), 21 wt % of silicon carbide particles (0.6 μm in average particle size), 15 wt % of silica sol, 5.6 wt % of carboxymethylcellulose and 28.4 wt % of water, then it was cut with a diamond cutter, thereby a cylindrical ceramic block 15 was manufactured.

Next, the same paste as the adhesive paste is coated on the outside surface of the ceramic block 15, thereby a sealing material layer having a thickness of 0.2 mm is formed. Also, the sealing material layer is dried at 20 degrees Celsius and made to solidify, thereby, finally, a cylindrical honeycomb structure having a diameter of 143.8 mm× a length of 150 mm was manufactured. This honeycomb structure was set as the examination body 1.

Manufacturing of an Examination Body 2-9

7000 wt % of α-silicon carbide particles (10 μm in average particle size), 3000 wt % of α-silicon carbide particles (0.5 μm in average particle size) and 570 wt % of the organic binder (methylcellulose) were mixed by dry mixing, and thereby, a mixture composition was obtained.

Next, 330 wt % of a plasticizer (NOF Corp., UNILUB), 150 wt % of glycerin as a lubricant and water (appropriate amount) were added to the mixture composition; after having kneaded this mixture composition more, it was formed by the extrusion molding, and a rectangular pillar shaped molded body shown in FIG. 3 was obtained. The honeycomb structure is manufactured from the molded body in the same process as the examination body 1. This honeycomb structure was set as the examination body 2.

In a like manner, when a molded body was manufactured, each composition to show in FIG. 6 was mixed, and a mixture composition was formed. By a method the same as the examination body 1, honeycomb structures of examination bodies 3-9 were manufactured except that the molded body was manufactured by means of extrusion molding. Also, only with examination bodies 4-7 and the examination body 9, the quantity as described in the table as hollow acrylic particles of particle size shown in FIG. 6, respectively, were added. The acrylic particles were added as the aperture making agent.

(Providing of the Catalyst Carrying Layer)

For the above examination bodies 2-6, the alumina carrying layer of 20 g was provided against the appearance capacity 1 L of the honeycomb structure by the following processes. The providing amount of the catalyst carrying layer (the alumina carrying layer) shows as providing amount as opposed to the appearance capacity 1 L of the honeycomb structure as follows. For example, it is written as "the alumina carrying layer of 20 g/L is provided".

α-alumina was added to water and a dispersing agent (nitric acid solution) and these were mixed, the mixture was powdered for 24 hours, and thereby a slurry including alumina of average particle size of 2 μm was prepared. Next, each examination body was dipped into the obtained slurry, and after having raised them, each examination body was dried at 200 degrees Celsius. This process is repeated until the alumina carrying layer provided to the examination body becomes 20 g/L. After this, this examination body was fired at 600 degrees Celsius. After such a process, examination bodies 2-6 for which the alumina carrying layer of 20 g/L was provided are referred to as examples 6-10, respectively.

Also, for the above examination bodies, the alumina carrying layer of 40 g/L was provided in the same process as examination bodies 3-6, and these examination bodies are referred to as examples 11-14, respectively.

Also, the alumina carrying layer of 60 g/L was provided in the same process as examination bodies 3-7, and these examination bodies are referred to as examples 15-19, respectively.

Also, the alumina carrying layer of 80 g/L was provided in the same process as examination bodies 8, 4, 5, 6 and 9, and these examination bodies are referred to as examples 20-24, respectively.

Also, the alumina carrying layer was not provided in examination bodies 1, 2, 3, 4 and 6, and these examination bodies are referred to as examples 1-5, respectively. Each providing amount of the alumina carrying layer of the honeycomb structure of examples 1-24 is shown in FIG. 7.

(Evaluation Examination)

(1) The Measurement of Gas Permeability Coefficient

The gas permeability coefficient k of each honeycomb structure was measured. For the measurement, a sample which was manufactured by a manufacturing method that was different from each of the above-mentioned examples; that is the integral honeycomb structure sample which was formed by the extrusion molding in the shape of a cylindrical from the beginning was used. But even if the manufacturing methods were different, the same extrusion molding was processed using the same materials in the case of each of the above-mentioned examples, and samples were manufactured in the same firing condition. Thus, characteristics such as pore diameter of these samples are approximately similar in the case of each above-mentioned example. Also, a shape of the sample has a diameter of 25 mm and total length of the sample was 50 mm.

The gas permeability coefficient was measured as follows. First of all, as against each side of open end of the sample, a metallic tube having one end including an inner diameter which is almost the same as the circumference of the sample was attached, and a gap of a joint was sealed. Next, in the state that the metallic tube was attached at both ends, the sample is placed on a test bed so that a cylindrical axis of the sample becomes approximately level. Next, in the state that made air flow in from the open end side (inlet side) of an either metallic tube and made drain air from the other open end (outlet side) of the metallic tube, the difference in pressure of air ΔP between the inlet side and the outlet side of the metallic tube were measured. Also, the measurement was performed as against 20 points of air mass flow such that air mass flow Q which made the sample flow in was changed in the range of 0-80 L/min by using a massflow meter. 20 points of obtained data were plotted in a graph in which Q is assumed as a horizontal axis and ΔP/Q is as a vertical axis. Then, the gas permeability coefficient was calculated from an intercept of a straight line between plots (more precisely, by formula 1, the intercept of the straight line becomes C/k, and c is the constant). Also, the measurement was performed at room temperature. The result is shown in FIG. 7.

(2) The Measurement of Average Pore Diameter and Pore Rate

Before placing the catalyst carrying layer, a pore distribution was measured in the range of 0.1-360 μm of the pore diameter by means of a mercury injection method for the honeycomb structure of each of the examination bodies 1-9 with a porosimeter (Shimadzu Corp., AutoPore III 9420). Average pore diameter and pore rate of each examination body was obtained by this measurement. The obtained result were classified as examples 1-24, and are shown in FIG. 7.

(3) The Measurement of the Pressure Loss

The honeycomb structure of each of examples 1-24 was placed on the exhaust path of the engine, and air was supplied at 750 m$^3$/h in speed, and each pressure loss of the honeycomb structure was measured. The results are shown FIG. 7 and FIG. 9.

Figure 9:
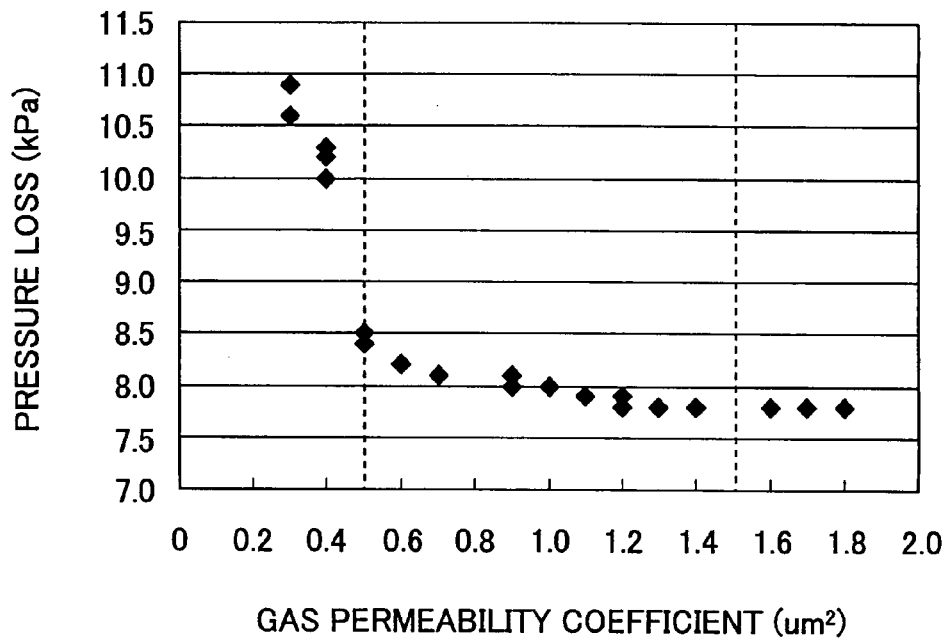
FIG. 9 is a graph for showing a relationship between gas permeability coefficient and pressure loss using the honeycomb structure of the embodiment according to the present invention.

As shown in FIG. 7 and FIG. 9, for the honeycomb structure having the gas permeability coefficient k to satisfy the relations where the gas permeability coefficient k is between about 0.5 μm$^2$ and about 1.5 μm$^2$, the pressure loss was low. In contrast, for the honeycomb structure whose gas permeability coefficient k is less than about 0.5 μm$^2$ (examples 1, 6, 11, 15 and 20), the pressure loss was high and it was beyond 10 kPa.

(4) The Measurement of the Capture Efficiency.

The honeycomb structure of each of examples 1-24 was placed on the exhaust path of the engine, and the capture efficiency of the honeycomb structure was measured. The capture efficiency was measured as follows. A diesel engine of 2 liters was driven under conditions of a rotation of 2000 rpm, and a torque of 47 N·m. Exhaust gas discharged from the engine by such a driving is distributed to the honeycomb structure. The amount of PM (P0) in exhaust gas before it flows into the honeycomb structure and the amount of PM (P1) in the exhaust gas which has passed through the honeycomb structure were measured by a PM counter. From the obtained result, the capture efficiency is calculated as the capture efficiency (%)=(P0−P1)/P0×100.

Figure 10:
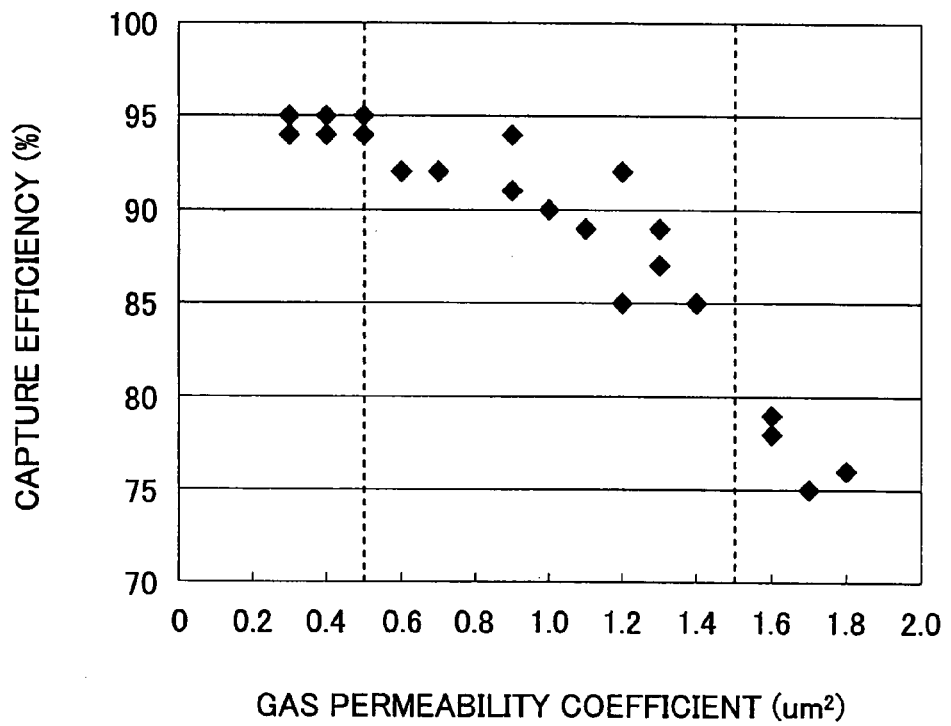
FIG. 10 is a graph for showing a relationship between gas permeability coefficient and capture efficiency loss using the honeycomb structure of the embodiment according to the present invention.

The result is shown in FIG. 7 and FIG. 10. As shown in FIG. 7 and FIG. 10, for the honeycomb structure having the gas permeability coefficient k to satisfy the relations where the gas permeability coefficient k is between about 0.5 $\mu m^2$ and about 1.5 $\mu m^2$, the capture efficiency was high. In contrast, for the honeycomb structure where gas permeability coefficient k is more than about 1.5 μm (examples 5, 10, 14, 19 and 24), the capture efficiency was bad and it was under 80%. Here, in this specification, a value of early stage of capture efficiency (exhaust gas is distributed to the honeycomb structure in a state of a new article or a state of mint condition, and it is a value of the capture efficiency that began capture just after that) is used for the evaluation.

(5) The Measurement of the Absorption Rate

Next, the absorption rate (water absorption) was measured for the honeycomb structure of examination bodies 1-9 (before placing the catalyst carrying layer). The absorption rate is an index that degree of liquid holding in a honeycomb structure is evaluated. This value of the absorption rate tends to a large change for the honeycomb structure where there are a lot of fine pores. As the reason for this, it is thought that the reason is because those pores hold liquid and liquid is not held for the honeycomb structure where there are a lot of fine pores. The measurement of the absorption rate was performed as follows. First of all, sample weight in a dry state was measured. Next, dipping can completely place a sample underwater, after having reversed the sample underwater, the sample was raised from the water, and water falling from the sample was dropped lightly. Next, the wet sample is placed in an aspirator (vacuum system), the absorption test was performed in a condition where amount of wind is 4.4 $m^3$/min and absorption pressure is 9.8 kPa, and the sample weight after absorption was measured. By means of dividing a weight difference of the sample between this value and a weight at the dry state in an early stage (dry time) of weight, the amount of absorption of the sample is obtained.

Figure 8:
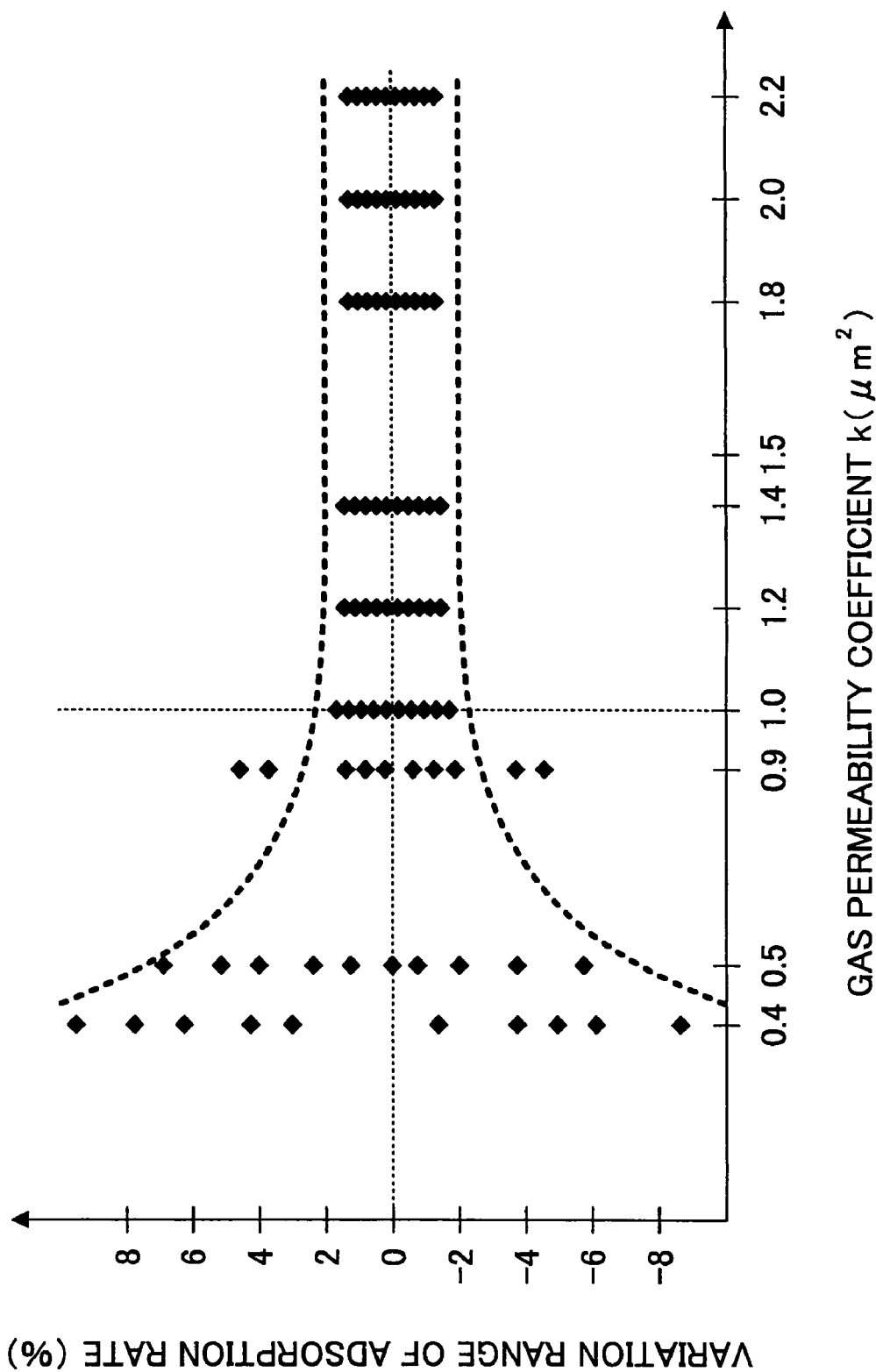
FIG. 8 is a diagram for showing a relationship between the gas permeability coefficient and a range of adsorption rate of the honeycomb structure of the embodiment according to the present invention.

Variation of a value of absorption rate when the above-mentioned measurement was repeated ten times, respectively, is shown against the gas permeability coefficient k for each examination body (before placing the catalyst carrying layer) in FIG. 8. Each point presented variation of absorption rate by each gas permeability coefficient at percentage and a curve of a dotted line is the additional line which is added to indicate a size of variation (a change) of absorption rate clearly. When the gas permeability coefficient k is less than about 1.0, the variation of values of absorption rate was drastically increased. As the reason for this, when the gas permeability coefficient k becomes too small, fine pores included in the honeycomb structure increase; it is thought that the reason is because of the tendency that fine pores are placed on the catalyst carrying layer and fine pores are not placed on the catalyst carrying layer becomes remarkable. As for the catalyst, the amount of catalyst fluctuates by an placement state of the catalyst carrying layer greatly so that it is placed on the catalyst carrying layer. Thus, it means that the change of the placement state of the catalyst carrying layer is great where the variation of values of absorption rate is great, and it is unfavorable so that it is thought that this leads to a fluctuating amount of application of an expensive catalyst. From such a point of view, especially for the honeycomb structure carrying the catalyst, it is preferable that the gas permeability coefficient k in a step before placing the catalyst carrying layer be in the range about 1.0 or more.

The present invention is not limited to the specifically disclosed embodiment, and variations and modifications may be made without departing from the scope of the present invention.

What is claimed is:

1. A honeycomb structure comprising a porous ceramic which is composed of several cells aligned across a cell wall longitudinally, the cell having either one end sealed, in which a gas permeability coefficient k of the cell wall is between about 0.5 $\mu m^2$ and about 1.5 $\mu m^2$.

2. The honeycomb structure as claimed in claim 1, in that a catalyst carrying layer and a catalyst are placed on the cell wall.

3. The honeycomb structure as claimed in claim 2, in that the catalyst carrying layer is provided with about 40 g or more against an appearance capacity 1 L of the honeycomb structure, and the gas permeability coefficient k in a step before placing the catalyst carrying layer is in the range about 1.0 $\mu m^2$ or more.

4. The honeycomb structure as claimed in claim 1, in that the porous ceramic comprises at least one selected from the group consisting of aluminum nitride, silicon nitride, boron nitride, titanium nitride, silicon carbide, zirconium carbide, titanium carbide, tantalum carbide, tungsten carbide, alumina, zirconia, cordielite, mullite, silica and aluminum titanate.

5. The honeycomb structure as claimed in claim 2, in that the catalyst carrying layer comprises at least one selected from the group consisting of alumina, titania, zirconia, silica and ceria.

6. The honeycomb structure as claimed in claim 2, in that the catalyst comprises noble metals.

7. The honeycomb structure as claimed in claim 6, in that the catalyst comprises at least one selected from the group consisting of platinum, palladium and rhodium.

8. The honeycomb structure as claimed in claim 2, in that the catalyst is a compound including any one of an alkali metallic element, an alkaline earth metallic element, a rare-earth element and a transition metal element.

9. The honeycomb structure as claimed in claim 2, in that the catalyst is provided both compounds which one compound including noble metals and the other compound including any one of an alkali metallic element, an alkaline earth metallic element, a rare-earth element and a transition metal element.

10. The honeycomb structure as claimed in claim 9, in that the catalyst comprises at least one selected from the group consisting of platinum, palladium and rhodium.

11. An exhaust gas purifying device; comprising a honeycomb structure, a casing covering the outer surface of the honeycomb structure and a holding sealer provided between the honeycomb structure and the casing, wherein the honeycomb structure comprising a porous ceramic which is composed of several cells aligned across a cell wall longitudinally, the cell having either one end sealed, in which a gas permeability coefficient k of the cell wall is between about 0.5 $\mu m^2$ and about 1.5 $\mu m^2$.

12. The exhaust gas purifying device as claimed in claim 11, in that a catalyst carrying layer and a catalyst are placed on the cell wall.

13. The exhaust gas purifying device as claimed in claim 12, in that the catalyst carrying layer is provided with about 40 g or more against an appearance capacity 1 L of the honeycomb structure, and
   the gas permeability coefficient k in a step before placing the catalyst carrying layer is in the range about $1.0\ \mu m^2$ or more.

14. The exhaust gas purifying device as claimed in claim 11, in that the porous ceramic comprises at least one selected from the group consisting of aluminum nitride, silicon nitride, boron nitride, titanium nitride, silicon carbide, zirconium carbide, titanium carbide, tantalum carbide, tungsten carbide, alumina, zirconia, cordielite, mullite, silica and aluminum titanate.

15. The exhaust gas purifying device as claimed in claim 12, in that the catalyst carrying layer comprises at least one selected from the group consisting of alumina, titania, zirconia, silica and ceria.

16. The exhaust gas purifying device as claimed in claim 12, in that the catalyst comprises noble metals.

17. The exhaust gas purifying device as claimed in claim 16, in that the catalyst comprises at least one selected from the group consisting of platinum, palladium and rhodium.

18. The exhaust gas purifying device as claimed in claim 12, in that the catalyst is a compound including any one of an alkali metallic element, an alkaline earth metallic element, a rare-earth element and a transition metal element.

19. The exhaust gas purifying device as claimed in claim 12, in that the catalyst is provided both compounds which one compound including noble metals and the other compound including any one of an alkali metallic element, an alkaline earth metallic element, a rare-earth element and a transition metal element.

20. The exhaust gas purifying device as claimed in claim 19, in that the catalyst comprises at least one selected from the group consisting of platinum, palladium and rhodium.

* * * * *